April 26, 1960
W. E. TANNER
2,933,812
COMPUTER
Filed March 14, 1956
3 Sheets-Sheet 1
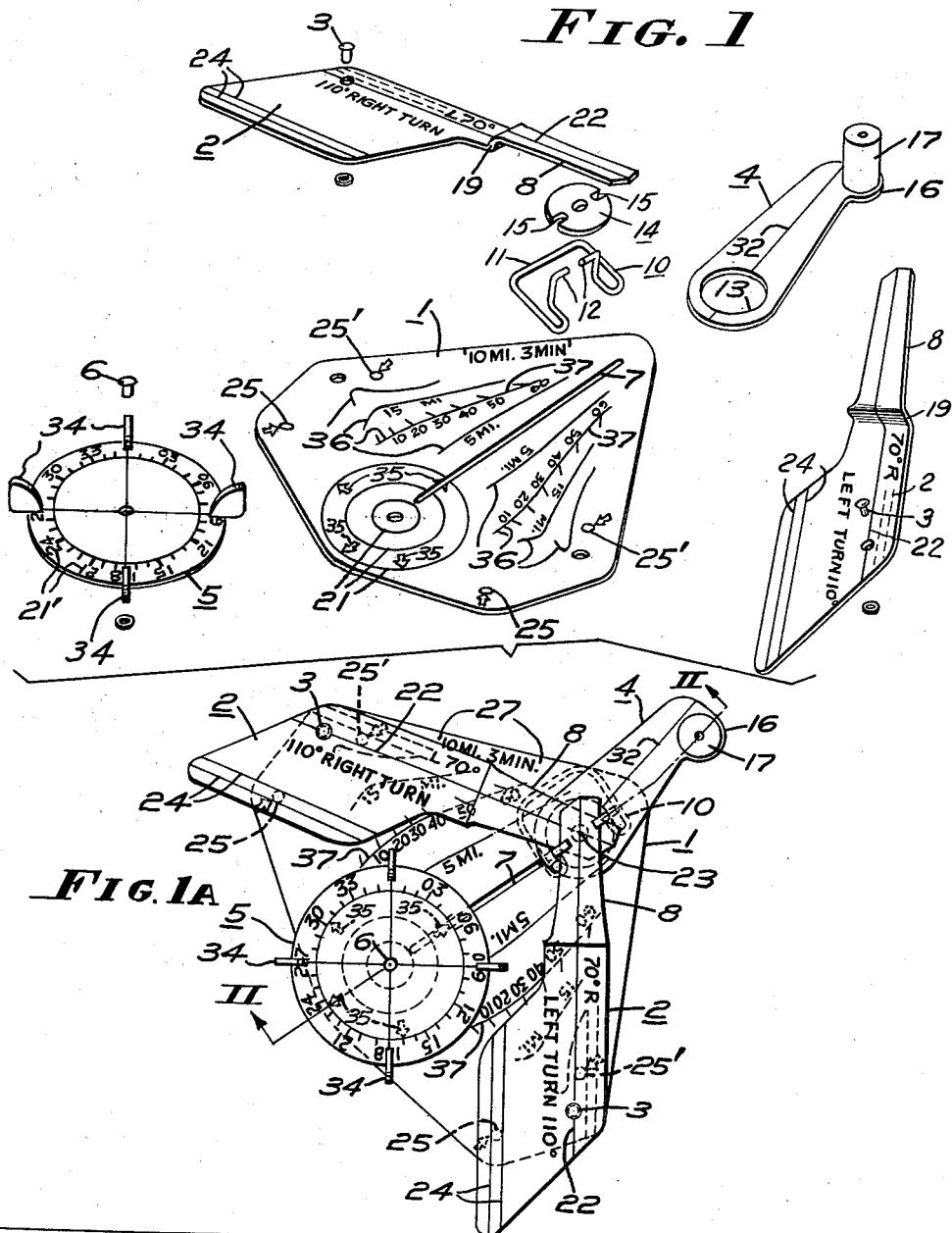
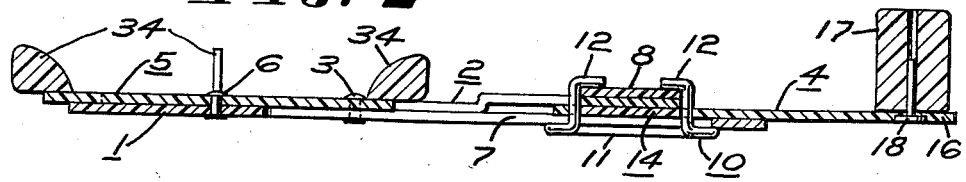

April 26, 1960  W. E. TANNER  2,933,812
COMPUTER

Filed March 14, 1956  3 Sheets-Sheet 2

INVENTOR:
WALTER E. TANNER
BY:
Beau, Brooks, Buckley & Beau,
ATTORNEYS.

April 26, 1960  W. E. TANNER  2,933,812
COMPUTER

Filed March 14, 1956  3 Sheets-Sheet 3

INVENTOR:
WALTER E. TANNER
BY:
Beau, Brooke, Buckley & Beau,
ATTORNEYS.

United States Patent Office 2,933,812
Patented Apr. 26, 1960

2,933,812
COMPUTER

Walter E. Tanner, West Newton, Mass., assignor to Bell Aircraft Corporation, Wheatfield, N.Y.

Application March 14, 1956, Serial No. 571,459

6 Claims. (Cl. 33—1)

This invention relates generally to the computer art, and more specifically to a new and useful computer designed for use with search radar to compute data required for the remote control of fighter-interceptors.

Even when fighter-interceptors are provided with optical or airborne interception radar search means for locating the target, an air defense system using piloted fighters requires some means for directing the interceptor aircraft into a position where the pilot can "see" the target and begin his attack thereon using such airborne sighting means. This "vectoring" of the fighter-interceptor, known as the fighter-interception or ground controlled interception problem, is done by an operator of ground-based air search radar who follows both the target and the fighter on the radar indicator and from that directs the fighter into a position such that the fighter's own radar seaching equipment can take over. This position for initiating the attack is rather critical for the more common side approach to the target, and the problem is to have the fighter-interceptor in the right position at the right time and with the correct heading relative to the target.

The primary object of this invention is to provide a computer which is extremely simple both in its construction and in its mode of operation, which is quickly set up and thereafter does not require any additional operations such as the reading of coordinates or the drawing of vector diagrams, and which will provide the desired data within a few seconds.

With this invention, the fighter is scrambled as soon as the ground search radar detects the approach of un- identified aircraft, herein called the target, and is directed onto a course approximately either parallel or anti-parallel to the target. The computer is set up directly on the radar screen during the climb of the fighter to the desired altitude, and the fighter then is directed to follow appropriate lines on the computer, including the making of a standard turn toward the target interception point at a time automatically determined by the computer.

More specifically, the computer is designed for one or more predetermined angles of attack, and for predetermined speed and rate of turn fighter-interceptor characteristics. Once two consecutive points of the approaching target are determined on the radar indicator, together with the wind direction and velocity at the target, the computer can be set up and automatcally calculates both parallel and anti-parallel approach courses, an approach aim point, right and left turn points, and right and left hand interception courses, all without additional operations except for moving the computer with the target on the radar screen.

The computer of this invention is characterized in one aspect thereof by the provision of a base member having associated therewith an annular first reference line and means providing a second reference line extending generally radially thereof, and means pivoted relative to the base member providing a third reference line selectively shiftable along the second reference line in intersecting relation thereto.

In another aspect thereof, the computer of this invention is characterized by the provision of a base member having annular first reference line means associated therewith denoting wind velocity and means providing a second reference line extending generally radially of the first reference line means, together with an arm member pivoted relative to the base member providing a third reference line intersecting the second reference line and denoting the interception course of the fighter to a target positioned at the point of such interesecting.

The foregoing and other objects and advantages of a computer in accord with this invention will become clearly apparent from the ensuing detailed description taken together with the accompanying drawings forming a part thereof wherein:

Fig. 1 is a view showing in exploded, perspective views the parts of a presently preferred form of computer according to the invention;

Fig. 1A is a plan view of a computer assembled from the parts of Fig. 1;

Fig. 2 is a sectional view of the computer of Fig. 1A taken about on line 2—2 thereof;

Figure 3:
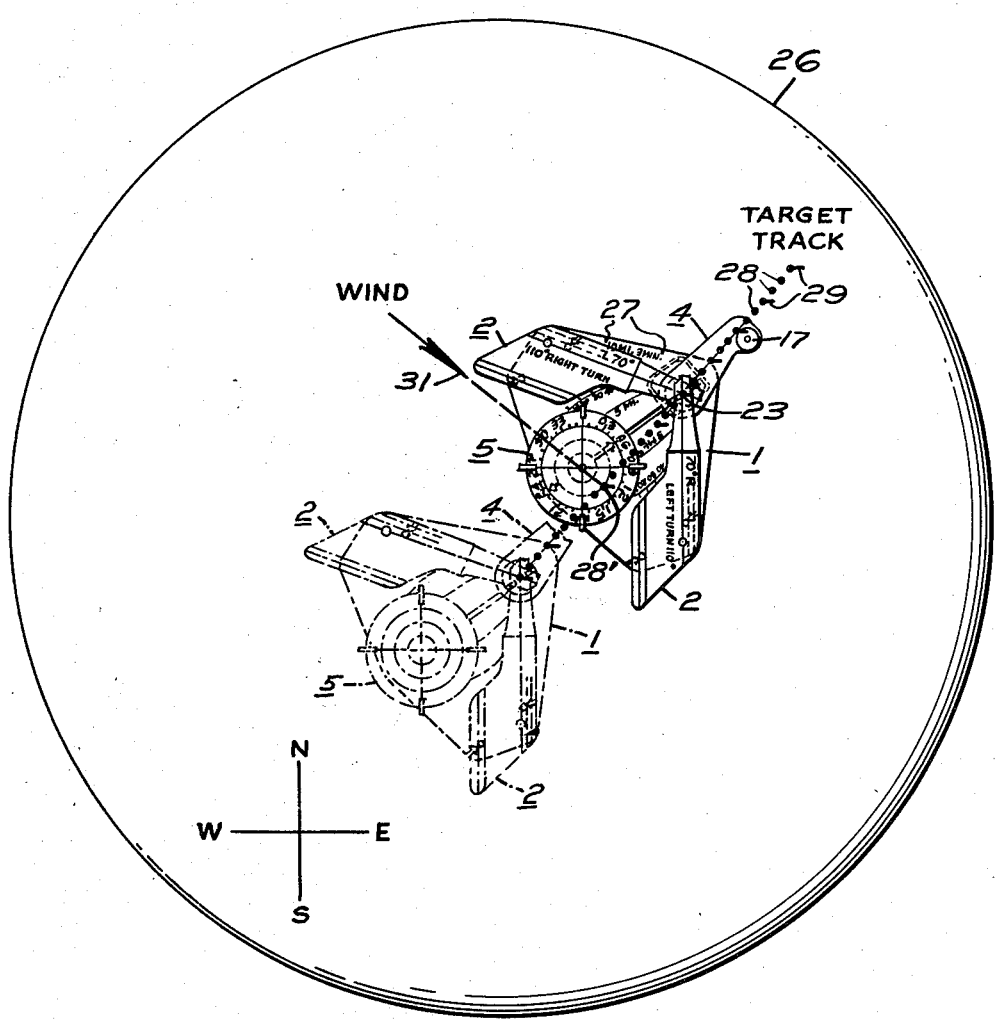
Fig. 3 is a generally diagrammatic view showing the mode of operation of the computer in conjunction with a radar indicating screen.

Referring now to the accompanying drawings and particularly to the embodiment of Figs. 1–3 thereof, a presently preferred form of computer according to this invention comprises a substantially transparent base member 1, a pair of symmetrically arranged substantially transparent arm members 2 pivotally connected adjacent one end thereof to the base member 1 as by the rivets 3, a substantially transparent target trail pointer member 4 and a substantially transparent dial member 5 pivotally connected to the base member 1 in symmetrical relation to the arm members 2 as by the rivet 6.

Base member 1 is slotted generally radially of disc 5 in symmetrical relation to arm members 2, as indicated at 7, and the arm members 2 each have elongated, finger-like pointer end portions 8 which are adapted to overlie slot 7 in alignment therewith and with each other. The arm member end portions 8 are held in overlapped relation over the slot 7 by a clip generally designated 10 and having a U-shaped base portion 11 bearing against the underside of the base member 1 on opposite sides of slot 7 and terminating in the upstanding inwardly facing hook portions 12 which extend through the slot 7 on opposite sides of the overlapped arm member pointer end portions 8 and thereover, to hold said end portions in overlapped relation. Clip 10 is movable along slot 7 and guides the arm member end portions 8 for movement therealong while maintaining the overlapped relation thereof in alignment with the slot 7.

Means are provided to facilitate moving the overlapped arm members 2 along slot 7, for a purpose to be described, comprising in this embodiment the target trail pointer 4 which is formed with a circular opening 13 receiving a circular bearing 14 which has diammetrically opposed notches 15 in its periphery accommodating the upstanding hook portions 12 of clip member 10. The target trail pointer 4 fits beneath the overlapped arm member end portions 8 and between them and the base member 1, whereby the bearing member 14 provides a bearing surface for the bottom one of the arm member end portions 8 which end portions slide on each other between the upstanding hook portions 12 as guides. The bearing member 14 also permits pivoting of the pointer member 4 relative to base member 1 for a purpose to be described.

For convenience in manipulating the member 4 and the crossed arm members 2, pointer 4 is provided with a laterally offset portion 16 carrying an upstanding handle part 17 adapted to be manually grasped, handle 17 being pivotally connected to the pointer member 4 as by the rivet 18.

It will be noted that the end portions 8 of arm members 2 are vertically offset, as at 19, to accommodate therebeneath pointer member 4 and dial member 5, with the uppermost arm member end portion 8 being vertically offset more than the other arm member end portion to accommodate such other end portion therebeneath. The various computer parts are designed and arranged so that while they can be readily adjusted they tend to retain their adjusted position. Also, it will be appreciated that the various computer members can be made of a substantially clear plastic or any other suitable material.

The computer is first set up in conjunction with the radar screen based on the geometrical configuration of the interception problem in terms of wind coordinates, and the computer then is moved with the target position as viewed on the radar screen to solve the approach problem in terms of target coordinates. To accomplish this, the computer is provided with certain reference lines and points, as follows. The base member 1 is provided with a series of concentrically arranged, annular first reference lines 21, concentric with the dial member rivet 6, and in the instant case there are three such reference lines denoting wind velocities in the target area of 50, 100 and 150 miles per hour, respectively, reading from the rivet 6 radially outwardly. The dial member 5 is graduated and provided with appropriate indicia 21' to mark out a full 360° circle, concentric with the wind circles 21, forming a compass rose.

The slot 7, which extends radially of the dial member 5 and the wind circles 21, provides a second reference line. The arm members 2 are each provided with a third reference line 22 extending from the pivot points defined by the rivets 3 outwardly along the arm member end portions 8 where they overlap in alignment with the slot 7 to define a reference point 23. As will appear hereinafter, when the computer is positioned with the target at point 23 the lines 22 denote the target interception course for right and left turns. The center of the concentric wind circles 21, defined by the rivet 6, provides another reference point.

The computer of this embodiment is designed for a fighter speed of 460 knots, with a permissable variation of plus or minus 10%, rate of turn of 1.5 deg./sec., and a collision or interception course of 110° relative to the nose of the target, which determines the relative position and arrangement of various reference lines and points. Of course, the computer can be designed for any other fighter characteristics and/or interception courses. In addition, the illustrated computer is designed for an interception time of three minutes upon initiating the turn into the interception course.

The arm members 2 also are provided with reference lines 24 parallel to the interception course line 22, which denote turn lines at which the fighter-interceptor should begin its predetermined turn toward the target, these reference lines being used in conjunction with right and left turn approach aim reference points 25 on the base member 1, the appropriate turn line 24 being that which goes through the selected approach aim point 25 when the computer is properly set up.

In operation, referring now in particular to Fig. 3, the computer is used in conjunction with the plan position indicator of the search radar which presumably is ground based, the indicator screen being designated 26 and the target being tracked thereon. In this instance the computer is a substantially transparent overlay which is set up and operated directly on the radar screen 26 which is of a conventional construction. When the target first appears on the screen 26, its position and altitude is measured in a known manner and the fighter-interceptor is immediately commanded to take off, the radar operator giving him the target azimuth, range and altitude, together with a suggested heading comprising a suitable initial course intended to bring the fighter near an anti-parallel course relative to the target. Then the scale of the radar indicator screen is set so that ten mile markers thereon are spaced apart a distance equal to the distance between the range marks 27 on the base member 1, identified as "ten m." and "3 min.," designating a ten mile distance based on a three minute set up operation. This correlates the radar screen pattern with the computer. Then the target is tracked on the radar screen which shows the target as a succession of "blips" 28 the position of which is marked directly on the radar screen to make a record thereof. Those blips 28 which appear at successive one minute intervals are indicated by a flag 29 also marked on the screen 26. The target is tracked in this manner for a few minutes and then a line 31, comprising the wind vector, is drawn from the last flagged blip 28 identified as 28', against the direction of the wind.

At this point, the computer is placed directly on the radar screen 26 with the center 6 of the wind circles 21 aligned with the wind vector 31, and the computer is moved therealong until the last check point, comprising the blip 28' intersected by the wind vector 31, is on the wind circle 21 corresponding to the wind velocity at the target, which, in the illustrated instance, is 100 miles an hour. Then the reference point 23, defined by the intersection of reference lines 22 and slot 7, is aligned with the flagged blip 28 positioned three minutes before the last check point blip 28'. In other words, with the center 6 of the wind circles on the wind vector, the computer is moved until the check point 28' is aligned with the proper winds circle 21, and then the computer is rotated with point 6 on the wind vector and with point 28' on the appropriate wind circle 21 until slot 7 crosses the check point 28 three minutes earlier, and then the intersection of the lines 22 on arm members 2 is moved along slot 7 to this point. The computer now is set up, and it will be noted that once the target track and wind vector are determined only a few seconds are needed to set up the computer. Then the computer is moved with the target and solves the approach problem in target coordinates, as follows.

The pointer member 4 is provided with a reference line 32, and the pointer is rotated on bearing 14 until the reference line 32 is aligned with the target track as defined by the succession of blips 28. The setting of the computer is held constant, and the computer is moved as a whole along the target track with line 32 aligned therewith until the reference point 23 is aligned with blip 28'. From this point on, the computer is moved with the target as successive target blips appear, the point 23 being aligned at all times with the blip 28 representing the last target position, as illustrated in broken lines in Fig. 3. If desired, means such as a parallelogram device can be used to keep the computer in its proper relative position as it is moved across the radar screen 26.

Figure 4:
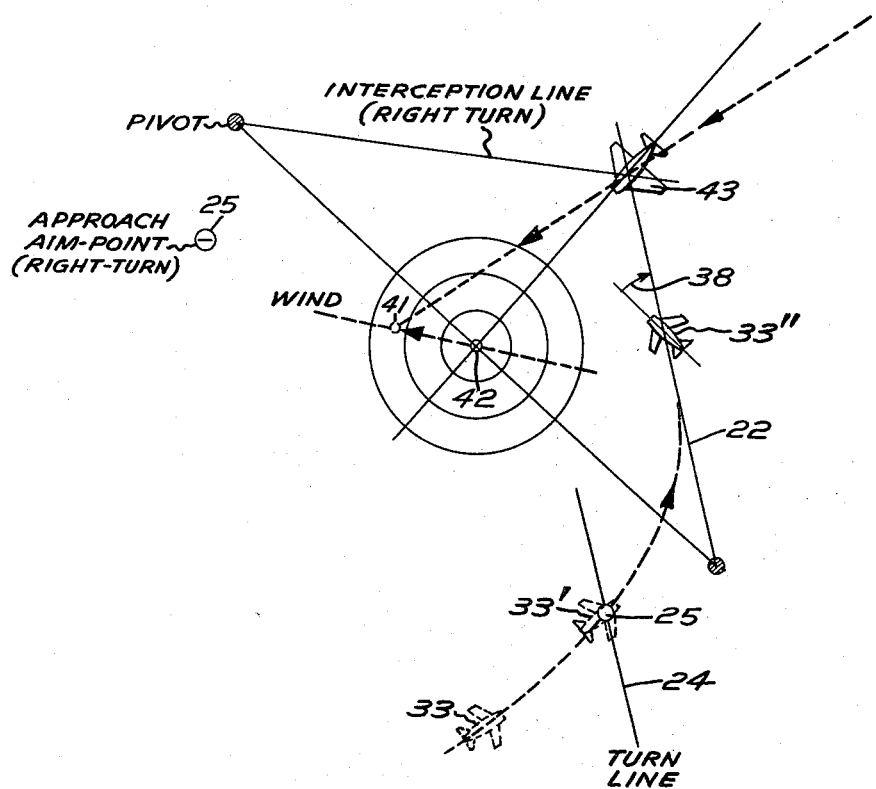
Fig. 4 is a diagrammatic view generally corresponding to Fig. 3 but illustrating the geometry of the computer operation for a computer designed for an interception angle of 90°.

The fighter-interceptor will be reflected on the radar screen 26, as indicated at 33 in Fig. 4 which differs from Fig. 3 in that it is set for a 90° turn, and the operator directs the fighter toward the selected approach aim point 25, 25' depending on whether the fighter is flying a parallel or anti-parallel course and whether he will be making a right or left turn toward the target. In the illustrated embodiment the fighter is closest to the approach aim point 25 under the left turn arm member 2 flying an anti-parallel course toward the target. If the fighter were on the other side of the target track he would be aimed toward the right turn approach aim point 25, and if the fighter were flying on either side but in a parallel course he would be directed toward the aim points 25' to make a 70° turn which would be the relative angle where the computer is set up for 110° turn flying an anti-parallel course. The fighter is guided toward the selected point 25, 25' by simply instructing him to turn right or left so many degrees, and the computer will give the proper approach course which is flown by the fighter shortly before he reaches his selected aim point.

The dial member 5 is set parallel to magnetic north and south, which headings will be provided on the radar scope, and the tabs 34 are provided to facilitate such adjustment. The base member 1 is provided with arrows 35 indicating four different flight directions comprising both parallel and anti-parallel approach courses, and right and left turn interception courses. Thus, with the fighter in the position 33 he will be directed to fly an approach course of 55°, and were he trailing the target and therefore flying a parallel approach course he would be directed to follow a course of 235°.

When the fighter crosses the turn line 24 which goes through the selected approach aim point 25, being the position shown at 33', he is directed into the predetermined turn toward the target. When the fighter has completed the turn, he will be on the interception course defined by the reference line 22, as shown at 33" and he is given the interception course which in the illustrated embodiment of Fig. 3 is 305° for a left turn. Had the pilot made a right turn, his interception course would have been 165°.

At this point, the fighter interceptor is properly aligned with the target and is on his own to pick up the target on his airborne radar or optical target seeking system.

However, it is a particular feature of this invention that the fighter interceptor is furnished with certain additional information, to wit, the radar viewing angle from the fighter to the target and the range to the target along the interception course. To this end, base member 1 is provided with additional reference lines 36 denoting ranges of 5, 10, 15 and 20 nautical miles to the target, reading from slot 7 laterally outwardly. Also, one reference line 36 is provided with appropriate indicia 37 denoting the radar viewing angle 38 to the target. A well trained fighter pilot can skip the search phase of his radar operation and immediately pick up the target, if supplied with this information, thus reducing the time of active radar transmission which will make him less vulnerable to the enemy defense and which will reduce mutual radar jamming. In the embodiment of Fig. 3 the target heading relative to the fighter is 55° to his right.

In Fig. 4, 41 represents the collision point in ground coordinates, and 42 represents this point in wind coordinates. The fighter-interceptor path shown is that where the computer is moved with target 43.

Therefore, it is seen that the computer of this invention fully accomplishes the intended objects and provides the necessary information for placing the fighter interceptor directly on course for a straight line interception, eliminating major course corrections after the turn and without any complicated operation by the ground search radar operator.

In order to read the markings on the computer and on the screen the front of the radar indicator is illuminated with a red light. A polarizing filter can be used on the face of the indicator to prevent the light from reaching the radar screen and an appropriate control such as a foot switch can be used to switch on the light whenever it is required. The target track is marked with a white grease pencil.

Figure 5:
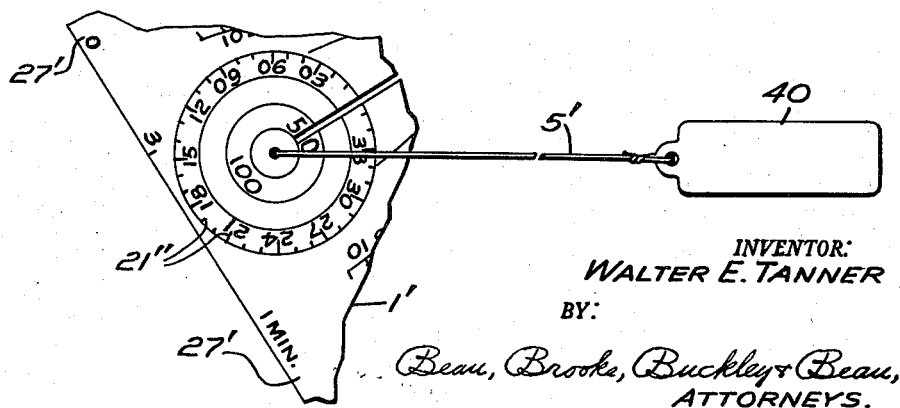
Fig. 5 is a fragmentary plan view similar to Fig. 1A but showing a modified form of computer designed for the geometry of Fig. 4.

A modified construction is shown in Fig. 5, wherein the parts are generally identical with the corresponding parts being identified in this view by primed numerals. In this instance, the computer is set up for the 90° turn called for in Fig. 4.

The major difference in construction in this computer comprises the use of a string 5', instead of the dial member 5, the string being weighted by tab 40. The compass rose markings 21" are placed directly on the base member 1' and it will be observed that in this instance they are arranged counterclockwise. The approach course is read by holding the string parallel to magnetic north-south and the interception course is read by holding the string parallel to magnetic east-west. The operation is essentially the same as previously described.

While more than enough time normally will be available to provide the three minutes required to set up the computer as previously described, if necessary the computer can be set up in one minute. To do this, the radar screen indicator is set up so that the ten mile markers thereon are spaced from "0" to "1 min.," comprising range markings 27'. The set up is the same except that the check point for one minute earlier, instead of three minutes ago, is used. However, once the computer is set up in terms of wind coordinates, the radar range is reset to equal "0" to "3," on the computer markings 27' without any change in the computer setting. Then the target is tracked and the fighter is controlled in the manner previously described. Obviously, the computer of Figs. 1–3 can have appropriate range markings to accomplish the same end.

While two illustrative embodiments have been illustrated and disclosed in detail herein, it will be appreciated that the invention is not necessarily limited to the details of such embodiments and that various modifications and variations will occur to those skilled in the art and can be made without departing from either the spirit of the invention or the scope of the appended claims. For example, only one arm member 2 can be provided where the turn is always in the same direction.

Having fully disclosed and completely described my invention, together with its mode of operation, what I claim as new follows:

1. A computer of the type described comprising, a base member having means thereon providing an annular first reference line, means providing a second reference line extending generally radially of said first reference line along said base member, a pair of arm members pivoted relative to said base member on opposite sides of said second reference line and extending thereacross in overlapped relation to each other, means providing a third reference line on each of said arm members, said arm members being movable to cause said third reference lines to intersect in alignment with said second reference line at multiple points therealong, means constraining said arm members to move in unison, and means constraining said last-named means to move along said second reference line.

2. A computer device for use with search radar to compute data required for interceptor control comprising, a base member having associated therewith annular first reference line means denoting wind velocity and means associated with said first reference line means providing a compass rose, second reference line means extending generally radially of said first reference line means along said base member, an arm member pivoted relative to said base member at one side of said second reference line means and having third reference line means extending therealong in intersecting relation to said second reference line means, said third reference line means denoting the interception course to a target positioned at the intersection of said second and third reference line means, and fourth reference line means extending along said base member in intersecting relation to said third reference line means denoting the range to such target along such interception course.

3. A device for use with search radar to compute data required for interceptor control comprising, a substantially transparent base member having annular first reference lines concentrically arranged thereon denoting wind velocities, means associated with said first reference lines providing a compass rose, a second reference line extending generally radially of said first reference lines along said base member, an arm member pivoted on said base member at one side of second reference line and having a third reference line crossing said second reference line and denoting the interception course to a target positioned at the point where said second and third reference lines cross, fourth reference lines extending along said base member in spaced relation to said second reference line and to each other denoting the range to such target along said interception course, and indicia means associated with at least one of said fourth reference lines denoting the angular position of such target relative to an interceptor on said interception course.

4. In a mechanism for use with search radar to compute data required for interceptor control, a base member having associated therewith an annular first reference line denoting wind velocity and means associated therewith providing a compass rose, means providing said base member with a second reference line extending generally radially of said first reference line, means providing an approach aim reference point on said base member on one side of said second reference line, an arm member pivoted on said base member to overlie said base member and said aim point, means providing a third reference line extending along said arm member to said second reference line and denoting the target interception course, and means providing another reference line on said arm member in substantial parallelism with said third reference line crossing said approach aim reference point and denoting a turn line for a fighter interceptor having a predetermined rate of turn.

5. A computer for use with search radar to compute data required for the remote control of fighter-interceptors comprising, a substantially transparent base plate member having associated therewith a compass rose and annular first reference line means concentric therewith denoting wind velocity, means providing a second reference line extending along said base plate member generally radially of said first reference line means, a pair of substantially transparent arm members symmetrically pivoted on said base plate on opposite sides of said second reference line, means defining a third reference line denoting a target interception course on each of said arm members, said arm members being movable to intersect said third reference lines in alignment with said second reference line and to shift the point of such intersecting therealong, and a substantially transparent pointer member connected to said arm members for so moving the same, said pointer member having a reference line thereon and being shiftable relative to said base plate member and said arm members to align its reference line with a target track marked on a radar viewing screen.

6. A computer of the type described comprising, a base member, means on said base member defining an annular first reference line, slot means in said base member defining a second reference line extending generally radially of said first reference line, an arm member pivoted relative to said base member in laterally offset relation to said second reference line and extending thereacross, arm member guide means movable along said slot means and constraining said arm member for movement therewith, and a pointer member connected to said guide means for so moving the latter while being mounted for movement relative to said guide means about an axis substantially normal to said base member.

References Cited in the file of this patent

UNITED STATES PATENTS

| | | |
|---|---|---|
| 1,311,641 | Christensen | July 29, 1919 |
| 1,917,282 | Woodside | July 11, 1933 |
| 1,969,939 | Nelson | Aug. 14, 1934 |
| 2,019,708 | Jones | Nov. 5, 1935 |
| 2,238,190 | Sawtelle | Apr. 15, 1941 |
| 2,244,125 | Siefkev | June 3, 1941 |
| 2,384,036 | Klemperer et al. | Sept. 4, 1945 |
| 2,437,243 | Curtis | Mar. 9, 1948 |
| 2,438,522 | Smith | Mar. 20, 1948 |
| 2,449,342 | Tardif | Sept. 14, 1948 |
| 2,703,677 | Harnwell | Mar. 8, 1955 |
| 2,767,913 | Mitchell | Oct. 23, 1956 |